(12) United States Patent
Rapp

(10) Patent No.: US 9,841,348 B2
(45) Date of Patent: Dec. 12, 2017

(54) FIBER INTEGRITY MONITORING

(71) Applicant: Xieon Networks S.a.r.l., Luxembourg (LU)

(72) Inventor: Lutz Rapp, Deisenhofen (DE)

(73) Assignee: Xieon Networks S.a.r.l., Senningerberg (LU)

( * ) Notice: Subject to any disclaimer, the term of this patent is extended or adjusted under 35 U.S.C. 154(b) by 197 days.

(21) Appl. No.: 14/769,711

(22) PCT Filed: Feb. 26, 2013

(86) PCT No.: PCT/EP2013/053808
§ 371 (c)(1),
(2) Date: Aug. 21, 2015

(87) PCT Pub. No.: WO2014/131433
PCT Pub. Date: Sep. 4, 2014

(65) Prior Publication Data
US 2015/0377737 A1    Dec. 31, 2015

(51) Int. Cl.
*G02B 6/44* (2006.01)
*G01M 11/00* (2006.01)
*H04B 10/079* (2013.01)
*G02B 6/255* (2006.01)

(52) U.S. Cl.
CPC .......... *G01M 11/30* (2013.01); *G02B 6/4446* (2013.01); *H04B 10/0791* (2013.01); *G02B 6/2558* (2013.01); *G02B 6/4454* (2013.01)

(58) Field of Classification Search
CPC ... G01M 11/30; G02B 6/4446; G02B 6/4454; G02B 6/2558; H04B 10/0791
See application file for complete search history.

(56) References Cited

U.S. PATENT DOCUMENTS

| 4,475,789 A | 10/1984 | Kahn |
| 5,784,514 A | 7/1998 | Yanagi et al. |
| 6,490,389 B1* | 12/2002 | Goodwin ........... H04B 10/0791 385/27 |

FOREIGN PATENT DOCUMENTS

JP    2012127903 A    7/2012

OTHER PUBLICATIONS

International Search Report and Written Opinion, PCT/EP2013/053808, dated Oct. 28, 2013, pp. 1-12.
(Continued)

*Primary Examiner* — Tony Ko
(74) *Attorney, Agent, or Firm* — Nelson Mullins Riley & Scarborough LLP

(57) ABSTRACT

It is provided an apparatus, comprising a box configured to conduct an optical fiber from an exterior to an interior of the box; at least one of a mounting means adapted to mount a connecting means to which the optical fiber may be connected and a guiding means adapted to guide the optical fiber, wherein the at least one of the mounting means and the guiding means is arranged in the interior of the box; a detecting means arranged in the interior of the box adapted to detect a first signal from the interior of the box, wherein the first signal is at least one of a light and a smoke; wherein the interior of the box is substantially shielded from a second signal from an exterior of the box, and the detecting means is suitable to detect the second signal in a same manner as the first signal.

20 Claims, 5 Drawing Sheets

(56) References Cited

OTHER PUBLICATIONS

Rocha, Ann Maria, et al.,"Detection of Fiber Fuse Effect Using FBG Sensors," IEEE Sensors Journal, IEEE Service Center, New York, NY, US, vol. 11, No. 6, Jun. 1, 2011, pp. 1390-1394, XP011354024.

* cited by examiner

FIBER INTEGRITY MONITORING

CROSS REFERENCE TO RELATED APPLICATIONS

This application is a 35 U.S.C. 371 national stage filing of International Application No. PCT/EP2013/053808, filed on Feb. 26, 2013. The contents of the aforementioned applications are hereby incorporated by reference in their entireties.

FIELD OF THE INVENTION

The present invention relates to an apparatus and a method related to fiber integrity monitoring. More particularly, the present invention relates to an apparatus and a method for fiber integrity monitoring to detect a fiber fuse or another damage.

BACKGROUND OF THE INVENTION

Abbreviations

APR automatic power reduction
APSD automatic power shutdown
FBG fiber Bragg grating
ROPA remote optically pumped amplifier
WDM wavelength-division multiplexing The development of optical fiber amplifiers has led to a new generation of optical communication systems. These systems offer significantly increased capacity by making use of wavelength-division multiplexing (WDM) and maximum transmission distances of more than 2000 km. In order to build such long links, the signal attenuation arising from Rayleigh backscattering during propagation is compensated by distributed amplification. For this purpose, inline amplifiers with moderate output power have been developed.

However, it is sometimes impossible or very expensive to install inline amplifiers, e.g. when connecting islands. Even in terrestrial systems, it is not always possible to make use of an intermediate amplifier. Therefore, systems employing sophisticated amplification technologies such as higher-order Raman pumping or remote optically pumped amplifiers (ROPA) have been developed that enable to bridge distances of 500 km or even more without any active element between the termination points. Sometimes, such systems are also used to build festoon like networks along the coast since this solution provides a better cost position as compared with the installation of terrestrial networks.

The advanced amplification technologies mentioned above require very high pump powers in the transmission fiber. Thus, there is a risk that optical components such as connectors are damaged. Even the transmission fiber or splices can be damaged at such high power levels. The latter case bears some major risk since the damaging effect can propagate within the fiber and can finally also reach the equipment on the transmit or recipient side.

In this respect, it is noted that pump powers may be launched into the transmission fiber from one or both sides. E.g., when using codirectional Raman pumping, the pump power is launched into the fiber at the transmit side. When using counterdirectional Raman pumping, the pump power is launched into the fiber at the recipient side. The fiber fuse always propagates to the location where the high power is launched into the fiber.

A critical effect in the transmission fiber is the "fiber fuse" effect, named due to its similarity with a burning fuse. This phenomenon is initiated by a local heating point, usually in a damaged or dirty connector, in a splice, or in a tight fiber bend. The local heating causes a strong light absorption that increases the temperature of the fiber core up to the Silica vaporization temperature. Due to the heat flow into the neighboring regions, the process propagates towards the light source and may lead to permanent destruction of the fiber along several kilometers. During this process, the fiber core is vaporized and visible white light is emitted. The propagation continues until the end of the fiber has been reached, the high power source is shut down, or the input power is reduced to a value below the threshold power [1].

FIG. 1 shows a photo of a fiber fuse propagating in a single-mode fiber [8]. During propagation, white light is emitted. The propagation velocity is quite small and is typically smaller than 3 m/s. The white light is emitted in all directions and the major part of this light is not guided in the fiber.

Typically, an automatic power reduction (APR) or even automatic power shutdown (APSD) mechanism is installed in optical communication systems in order to ensure laser safety. In the following, the APSD mechanism is considered as a special case of the APR mechanism in which the power is reduced to zero. This mechanism also provides some basic protection against fiber fuse or rather protection against its propagation along the optical fiber and to the equipment. Using APR or APSD, it is detected if the power at the receive side is reduced by a certain level (e.g. 10 dB), and in case such a decrease is detected, the power at one or both ends of the fiber is reduced below the fuse level or even switched off.

There are additional effects that can damage the transmission fiber. For example, the coating might heat up due to tight bending and might even be ignited. In this case, an alarm has to be sent to the management system since the expected lifetime of the system is reduced significantly.

FIG. 2 shows a photo of a damage of an optical fiber due to high power levels, wherein the optical coating is burned but data communication has not been interrupted. No significant increase of the fiber attenuation has been observed and the APR mechanism would not react to this damage. Nevertheless, it is important to detect this damage since the lifetime of the connection is significantly reduced.

Several methods have been proposed to detect the presence of a fiber fuse.

There are purely passive techniques such as the introduction of a fiber section with increased mode field diameter. In this way, the threshold power required to maintain the fuse is increased. As a consequence, the thermal wave propagation is stopped when reaching this section of the transmission fiber and the section acts as a kind of circuit-breaker [2][3][4][5]. However, this technique requires the incorporation of external elements on the network. Thus, additional losses are introduced and the repair of the cable becomes more difficult.

The second category of techniques aims at detecting the fiber fuse and shutting down the pumps. For example, it has been proposed to observe the electrical spectrum of the back-reflected light [5]. Major drawbacks of this technique are the increased cost for implementation, the increased attenuation at the launch side due to the circulator, and the need to characterize the fiber propagation characteristics of the transmission fiber (mainly the void interval).

A major drawback of this technique is that traffic is interrupted when upgrading an already running system that is not offering the corresponding fiber integrity monitoring technique.

Furthermore, the use of fiber Bragg gratings (FBGs) acting as temperature sensors has been proposed [6]. The FBGs are placed in physical contact with the optical fiber with a high thermal conductivity compound in between. The advantages of this solution are lower implementation cost as compared with the other techniques and the possibility of being placed in a remote point of the network without affecting the transmission path itself.

Further techniques are related to the routing of signals. The idea is to route the signals in the network in such a way that the total power level nowhere exceeds the threshold level for the fiber fuse effect. These techniques are only applicable if the main contribution to the total power stems from the channels. However, this is not the case e.g. in long single-span applications.

REFERENCES

[1] M. Facão et al., "Traveling Solutions of the Fuse Effect in Optical Fibers", IEEE Journ. Lightw. Technol., vol. 29, no. 1, Jan. 1, 2011
[2] M. P. Hand et al., "Single-mode tapers as 'fiber fuse' damage circuit-breakers", Electron. Letters, vol. 25, no. 1, Jan. 5, 1989
[3] Maroney et al., "Fiber fuse protection", U.S. Pat. No. 6,526,192, Feb. 25, 2003
[4] Takenaga, "Fiber fuse terminator", U.S. Pat. No. 8,244, 091, Aug. 14, 2012
[5] K. S. Abedin et al., "Remote detection of fiber fuse propagating in optical fibers", Proc. OFC, 2009, OThD5
[6] Brito André et al., "Method for determining a fibre fuse effect in optical networks and corresponding monitor", WO 2011/071405
[7] Maroney et al., "Fiber fuse protection", U.S. Pat. No. 6,628,871, Sep. 30, 2003
[8] A. M. Rocha et al., "Detection of fiber fuse effect using FBG sensors", IEEE Sensors Journ., vol. 11, no. 6, June 2011
[9] K. Seo et al., "Evaluation of high-power endurance in optical fiber links", Furukawa review, no. 24, J2003

SUMMARY OF THE INVENTION

It is an object of the present invention to improve the prior art. In detail, it is an object to monitor fiber integrity without physically affecting the optical fiber.

According to a first aspect of the invention, there is provided an apparatus, comprising an optical fiber adapted to propagate propagating light; a detecting means adapted to detect at least one of a detection light and a smoke as a first signal caused by a damage of a portion of the optical fiber, wherein the detection light is not propagated through the optical fiber.

The detecting means may not be in physical contact with the portion of the optical fiber.

The apparatus may further comprise a box, wherein the detecting means and the portion of the optical fiber may be arranged in an interior of the box; at least the interior of the box except for the portion of the optical fiber may be shielded from a second signal from an exterior of the box; and the detecting means is adapted to detect the first signal and is also suitable to detect the second signal in a same manner.

According to a second aspect of the invention, there is provided an apparatus, comprising a box; an optical fiber whereof at least a portion is arranged in an interior of the box; a detecting means arranged in the interior of the box and configured to detect a first signal, wherein the first signal is caused by a damage of the portion of the optical fiber; at least the interior of the box except for the portion of the optical fiber is shielded from a second signal from an exterior of the box; and the detecting means is adapted to detect the first signal and is also suitable to detect the second signal in a same manner.

The first signal may comprise at least one of a detection light and a smoke.

The box may be a fiber distribution box comprising in the interior of the box a connecting means to which the portion of the optical fiber may be connected. The connecting means may comprise at least one of a splice and a connector.

In the apparatus according to any of the first and second aspects, the damage may comprise at least one of a fiber fuse and a burning of a coating of the optical fiber.

In the apparatus according to any of the first and second aspects, the optical fiber may have, at the portion, a small radius of curvature and/or may be close to a disturbance.

According to a third aspect of the invention, there is provided an apparatus, comprising a box configured to conduct at least one optical fiber from an exterior of the box to an interior of the box or vice versa; at least one of a mounting means adapted to mount a connecting means to which the optical fiber may be connected and a guiding means adapted to guide the optical fiber, wherein the at least one of the mounting means and the guiding means is arranged in the interior of the box; a detecting means arranged in the interior of the box adapted to detect a first signal from the interior of the box, wherein the first signal is at least one of a light and a smoke; wherein the interior of the box is substantially shielded from a second signal from an exterior of the box, and the detecting means is suitable to detect the second signal in a same manner as the first signal.

The connecting means may comprise at least one of a splice and a connector. The mounting means may be a fitting aids. The guiding means may be a guidance such as a guidance bar or a groove.

The apparatus according to any of the first to third aspects may further comprise first comparing means adapted to compare the first signal with a first predefined threshold; and alarming means adapted to cause an alarm generating means to generate an alarm if the first signal exceeds the first predefined threshold.

The apparatus according to any of the first to third aspects may further comprise second comparing means adapted to compare the first signal with a second predefined threshold; and controlling means adapted to control a light source injecting propagating light into the optical fiber such that a light intensity of the propagating light does not exceed a fuse threshold if the first signal exceeds the second predefined threshold.

The first and second comparing means may be respective comparators. The alarming means may be an alarm controller. The controlling means may be a light source controller.

The detecting means in the apparatus according to any of the first to third aspects may be a detector such as a light detector or a smoke detector.

According to a fourth aspect of the invention, there is provided a system, comprising a plurality of optical fibers; and a detecting apparatus according to any of the first to third aspects, wherein at least one portion of at least one of the plurality of optical fibers is comprised by the detecting apparatus.

According to embodiments of the invention, at least one of the following advantages may be achieved:
  The fiber is not physically affected by the monitoring;
  The light propagation through the fiber is not affected by the monitoring;

The monitoring is reliable;

A fiber fuse is detected faster than by APR;

The part of the fiber transmission path where fiber fuse occurs most likely, in particular the fiber distribution box, is easily monitored.

The monitoring equipment is relatively cheap;

The monitoring equipment may be easily added to existing fiber installations.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

In principle, a fiber fuse can be initiated at various locations of a long single-span link. However, the probability is highest at the termination points, mainly at the transition point from the pigtail of the equipment to the transmission fiber due to the involved connectors or splices and the bending in splice boxes. Furthermore, the power levels are highest at the fiber ends. Whereas damages of the pigtails can be repaired on-site, damaged equipment (amplifiers etc.) has to be sent back to the manufacturer causing significant delay and cost. Therefore, a protection mechanism avoiding damages at least of the equipment is needed.

Most of the conventional methods to detect a fiber fuse require some modification of the optical path or some modification of the cable.

According to embodiments of the invention, a relatively cheap solution to detect a fiber fuse and other damages in most cases is provided. Therein, no optical components modifying the optical path are required. Furthermore, since neither the detector nor—if applicable—a transmission member for transmitting the signal to the detector is in physical contact with the fiber, a mechanical damage of the fiber while installing the detector (and the transmission member, if applicable) is less likely to occur.

Figure 3:
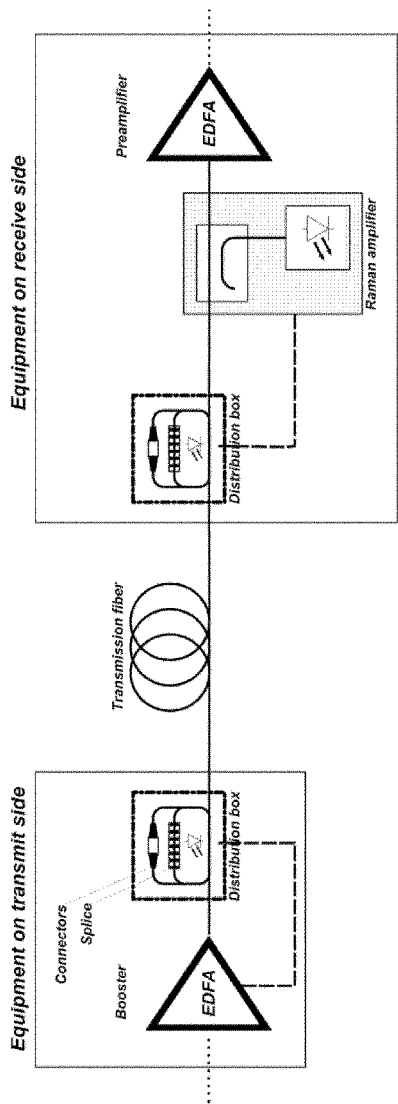
FIG. 3 shows a typical setup of a long single-span system.

FIG. 3 shows a typical setup of a long single-span system. At the transmit side, there is a booster amplifier with output powers that might even exceed 2 W. Instead of the booster amplifier, there may also be a codirectional Raman pump. On the receive side, there may be a Raman amplifier comprising a high power Raman pump (several Watts). This pump can also be replaced by e.g. a ROPA pump. Both, signals and pumps are propagating within the fiber (propagating light). The power inside of the optical fiber may amount to more than 1 W on both ends of the link. Thus, the total power may be above the fiber fuse threshold and a fiber fuse might occur.

In some preferred implementations, the equipment is spliced directly to the transmission fibers. In other implementations high power connections are used. In order to protect the splices or the connectors, the pigtails are included in a distribution box (which might also be called splice box). In typical installations, the distribution box is passive, i.e. there is no communication between the distribution box and the rest of the equipment.

According to embodiments of the invention, a photodiode or another light detector is placed inside of the distribution box to detect any visible light emitted within the box (detection light). Since the fiber fuse is accompanied by the emission of white light, the photodiode is able to detect the propagation of a fiber fuse in the fiber section that is coiled up in the distribution box. Since typically the smallest bending radius is found inside of this box and also other disturbances of the fiber integrity such as splices and connectors are located inside of the box, the majority of fiber fuses can be detected in this way.

For the detection of the signal indicating the fiber damage, no physical connection between the fiber and the detecting means is required. Nevertheless, a physical connection between fiber and detecting means is within the scope of the invention. For example, the detecting means might be fixed to the fiber by adhesives.

Figure 4:
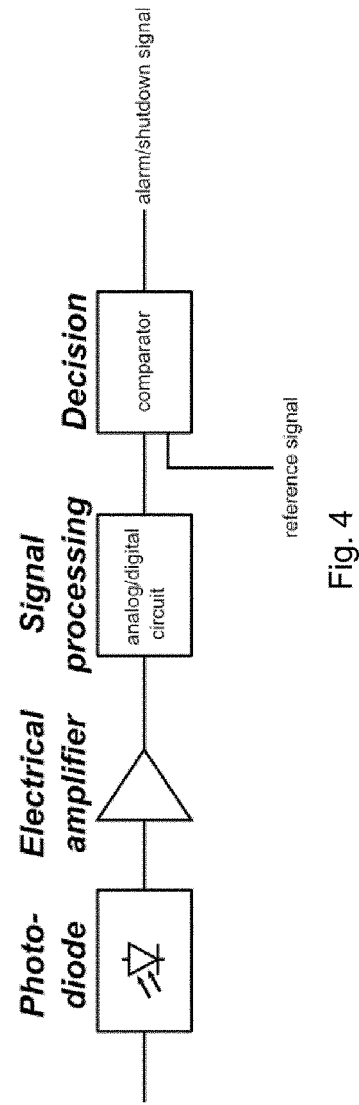
FIG. 4 shows an exemplary circuit used for detection of fiber damages according to an embodiment of the invention.

The photodiode (light detector) may be connected to an electric circuitry. FIG. 4 shows an example for the circuitry used for detection of fiber damages. First, the signal of the photodiode, e.g. the photocurrent, is amplified. In a next step, some signal processing such as low pass filtering, moving average calculation, integration over given time frame, . . . is applied. If the output of this step exceeds respective predefined limits, an alarm is sent and/or the amplifiers or pumps are controlled to a lower output level or even shut down. In such a way, a power reduction or shutdown of the pump or the booster can be initiated and the propagation of the fiber fuse is halted. Furthermore, an alarm can be sent to the management system.

The connection can be established e.g. via the backplane of the rack in which the fiber distribution box is installed or by an electrical cable. The bandwidth requirements of this connection are very relaxed thanks to the small propagation velocity of the fiber fuse. If the same distribution box is shared among several links, the photodiode via the electric circuit may be connected to all amplifiers launching their power into the fiber at the location of the box.

According to some embodiments of the invention, instead of or in addition to the light, smoke in the box may be detected. If smoke only is detected, the sensitivity may be lower than for light, and false alarms are more likely. By detecting smoke, e.g. burning optical coating which does not directly interrupt or strongly reduce optical transmission power may be detected and/or distinguished from a fiber fuse. Any smoke detector such as a conventional smoke detector may be used to detect the smoke.

Figure 8:
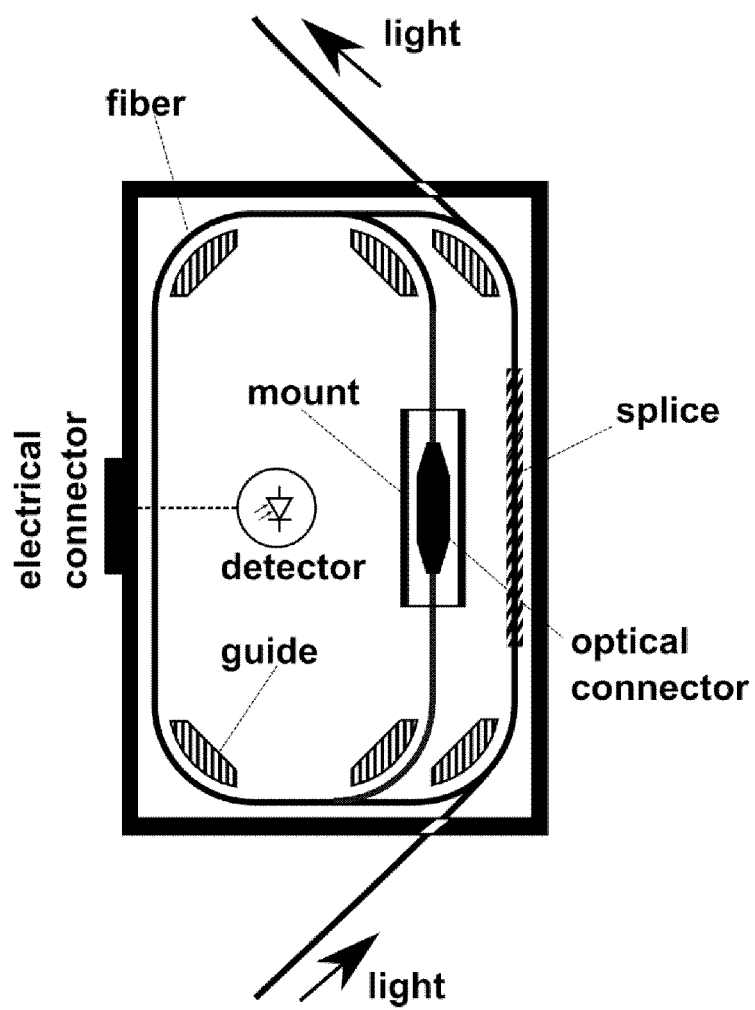
FIG. 8 shows a fiber distribution box according to an embodiment of the invention.

FIG. 8 shows a fiber distribution box according to an embodiment of the invention in which fibers are mounted. Fibers are conducted from the exterior to the interior of the box and vice versa via openings in the housing. The openings are designed in such a way that the interior is sufficiently shielded from external light when equipped with fibers. The detecting means is placed inside of the box preferably in such a way that a damage occurring anywhere in the box is detected with high probability. Splices and connectors connecting different fibers are fixed by dedicated mounts (mounting means). Furthermore, there are some guiding structures (guiding means) that ensure that the bending radius of the fiber does not fall below the minimum allowed bending radius. An electrical connector allows to connect the detector in the box to an evaluation system such as an alarming system or a control system for a light source. Placing the detector in a box such as the fiber distribution box has the advantage that the light detection is not disturbed by external light sources because the box shields external light. The shielding may be perfect but needs not to be perfect. For example, it may be sufficient if the external signal (light and/or smoke) is shielded to such an extent that the detector considers the external signal as a substantially constant background even if it changes by an extent typical for the external environment. For example, the detector may consider the occurrence of a damage on the fiber portion in the box only if the detected signal exceeds a certain absolute threshold, or a certain threshold over a time average of the previously detected signal.

However, in some cases, the box might not be tight enough, or it might be difficult to install a box, potentially even at a place where a fiber fuse is likely to occur (critical portion: e.g. small bending radius of the fiber and/or close to other disturbances of the fiber integrity such as splices and connectors). In particular in these cases, embodiments of the invention may be employed, wherein a focusing optics is provided at the detector, imaging the critical portion onto the detector, preferably with a low depth of field.

A bending radius is considered as small if it is less than 10 mm, preferably less than 7 mm, more preferably less than 1.5 mm.

If light is used to detect the damage, a portion of the optical fiber is considered to be close to a disturbance if it is less than 10 m, preferably less than 1 m, more preferably less than 10 cm away from the disturbance. If smoke is used for the detection, a portion of the optical fiber is considered to be close to a disturbance if it is less than 50 cm, preferably less than 10 cm, more preferably less than 3 cm away from the disturbance. The different distances from the disturbance for light and smoke, respectively, reflect the different propagation velocities of these signals used for detection which result in different detection times at the detector.

Some embodiments of the invention provide some significant advantages as compared with the known APR mechanism based on detection of a power decrease at the other end of the transmission link:

By the known APR mechanism, the communication is not interrupted immediately when the fiber fuse has been initiated. As shown in [9], it takes several seconds until the power detected at the receive side has dropped by 10 dB and the APR mechanism is activated. This problem of APR is enhanced in systems with ROPA since the gain of the remote erbium-doped fiber increases with decreasing input power. In contrast to that, embodiments of the invention lead to an earlier shutdown (or power reduction) of the high power sources and, as a consequence, smaller length of the fiber that is damaged.

Figure 1:
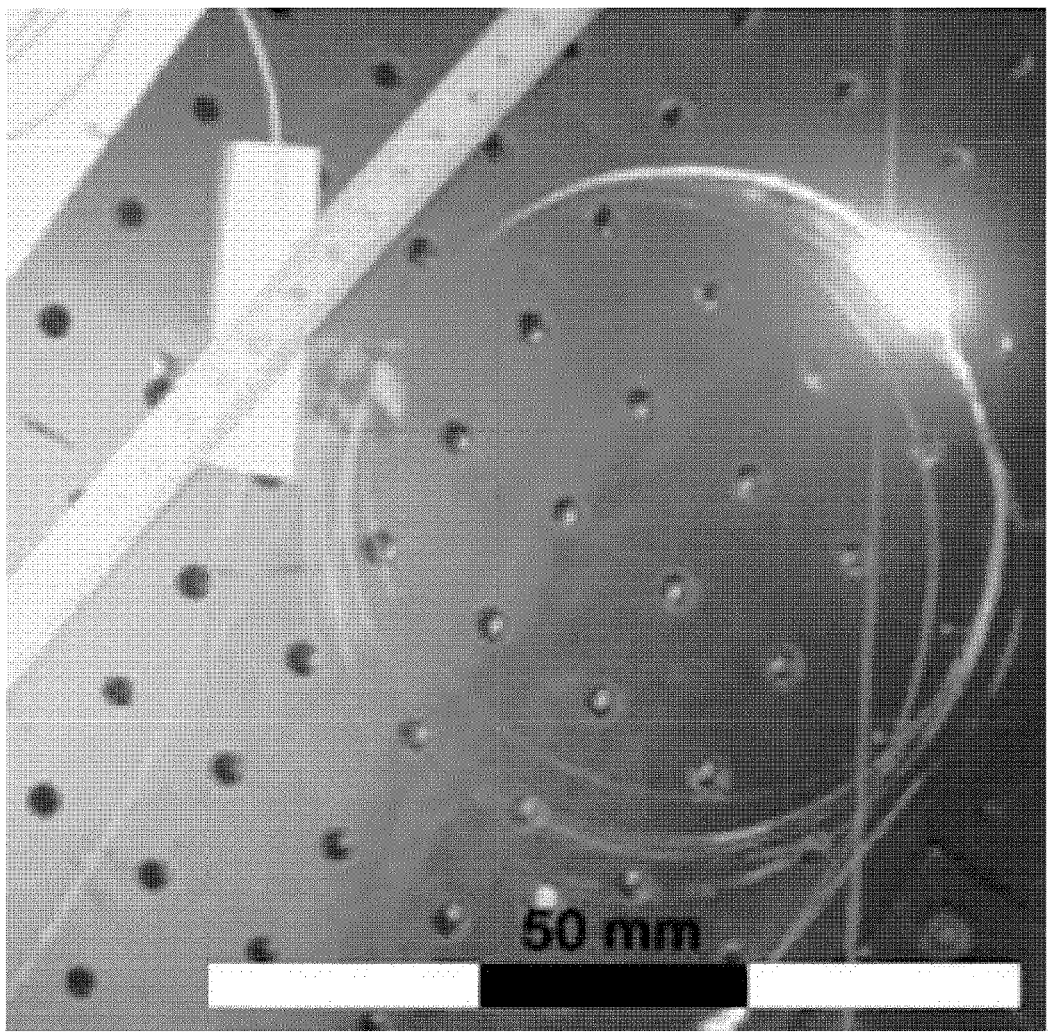
FIG. 1 shows a fiber fuse in a standard single mode fiber.
Figure 2:
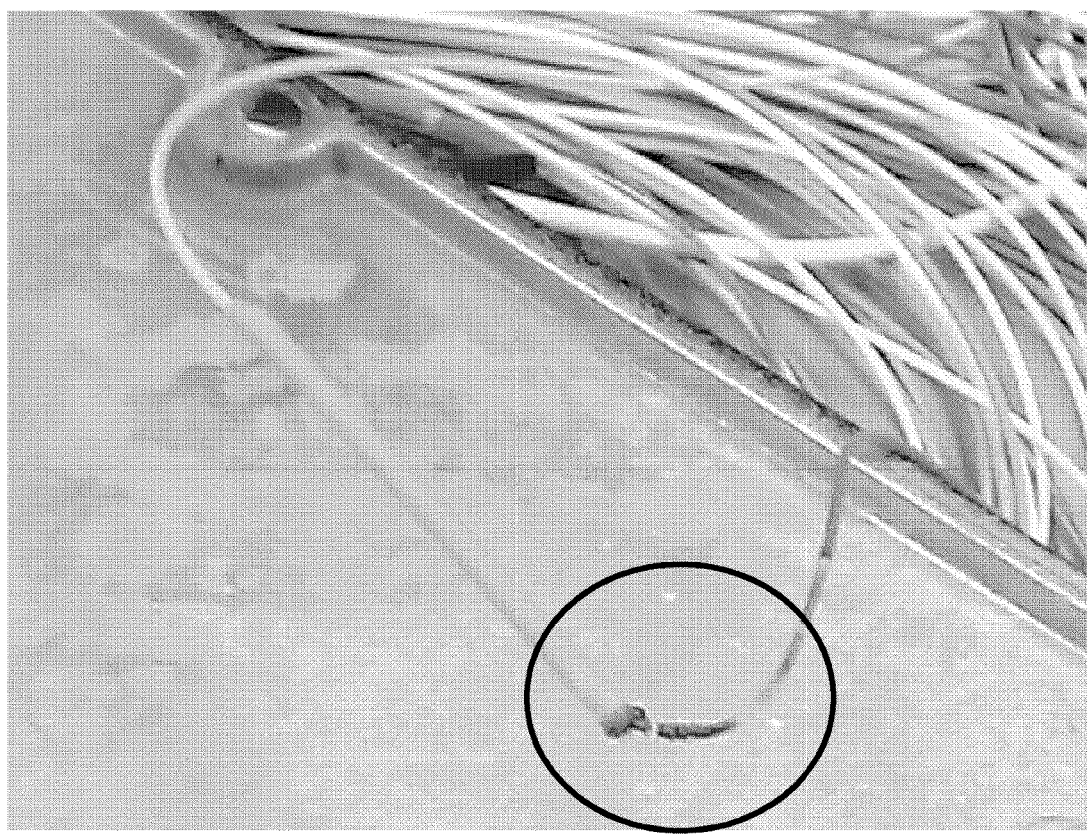
FIG. 2 shows a damage of an optical fiber due to high power levels.

Furthermore, according to embodiments of the invention, other damages of the fibers than fiber fuse may be detected, such as burning of optical coating as shown in FIG. 2. In this case, the coating has been ignited but data communication has not been interrupted. No significant increase of the fiber attenuation has been observed and the known APR mechanism would not react to this damage. Nevertheless, it is important to detect this damage since the lifetime of the connection is significantly reduced. This detection may be achieved e.g. if smoke is detected as the relevant signal.

Figure 5:
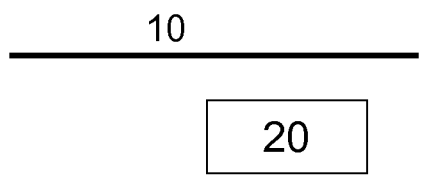
FIG. 5 shows an apparatus according to an embodiment of the invention.

FIG. 5 shows an apparatus according to an embodiment of the invention. The apparatus may be comprised e.g. in a fiber distribution box. The apparatus comprises an optical fiber 10 and a detecting means 20. The detecting means 20 may detect a first signal such as light and/or smoke which is caused by a damage of a portion of the optical fiber 10 (S10). The damage may be e.g. a fiber fuse and/or burning of a coating of the optical fiber 10. If light (detection light) is detected as the first signal, the same is not transmitted through the optical fiber, i.e. the detection light is different from the light propagated through the optical fiber 10. The detecting means 20 may be physically separated from the portion of the optical fiber 10. The detecting means 20 may also be arranged such that the detecting means 20 is physically attached to the optical fiber 10.

Figure 6:
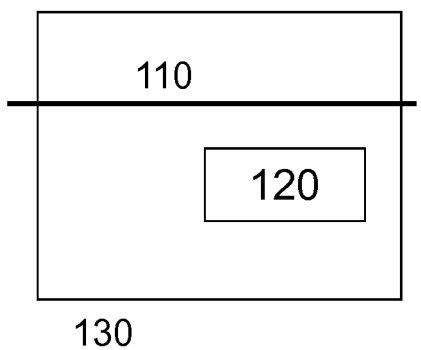
FIG. 6 shows an apparatus according to an embodiment of the invention.

FIG. 6 shows an apparatus according to an embodiment of the invention. The apparatus may be comprised e.g. in a fiber distribution box. The apparatus comprises a box 130 which may be e.g. a fiber distribution box or may be comprised in a fiber distribution box. The apparatus comprises further an optical fiber 110 whereof at least a portion is arranged in an interior of the box 130; and a detecting means 120 arranged in the interior of the box 130. The detecting means 120 may detect a first signal caused by a damage of the portion of the optical fiber 110. The damage may be e.g. a fiber fuse and/or burning of a coating of the optical fiber 10. Depending on the signal to be detected (first signal), the detecting means may be e.g. a light detector or a smoke detector. The detecting means 120 may be physically separated from the optical fiber 110. In some embodiments, the detecting means and/or a transmission member for transmitting the signal to the detecting means 120 may be in physical contact with the optical fiber 110.

The interior of the box 130 is shielded from a second signal from an exterior of the box 130, except for light propagating in the portion of the optical fiber such as data signals entering the portion of the optical fiber 110 within the box 130. However, this propagating light is confined to the optical fiber 110 to such an extent that it may not be detected by the detection means 120. The first and second signals correspond to each other. E.g., if the first signal is light, the second signal is light, too, and if the first signal is smoke, the second signal is smoke, too. In general, signals correspond to each other if the detecting means 120 may detect each of them in a same manner such as light detection or smoke detection.

As already indicated above, light propagating within the optical fiber is guided and is therefore not detected by the detection means. However, some further precautionary measures can be taken to avoid any false alarm due to leaked out light. Signals transmitted in optical fibers are typically located in the wavelength range around 1550 nm, whereas the detection means 120 is designed to detect visible light. Thus, some further suppression of leaking light components is possible by using detectors that are not sensitive to radiation in the infrared range. In case the material used in the detector for detection is sensitive to infrared power, this can be achieved by depositing a coating acting as filter on the surface of the detector.

Figure 7:
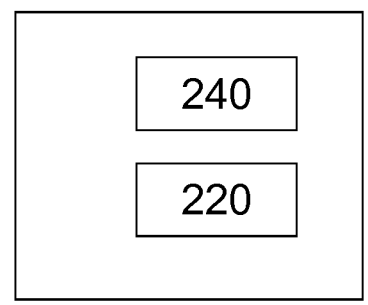
FIG. 7 shows an apparatus according to an embodiment of the invention.

FIG. 7 shows an apparatus according to an embodiment of the invention. The apparatus comprises a box 230 (fiber distribution box) and in its interior a detecting means 220, and at least one of a mounting means 240 and a guiding means 240. The mounting means is adapted to mount a connecting means such as a connector or a splice to which the optical fiber may be connected. The guiding means is adapted to guide the optical fiber in the box.

Similar to the box 130 of FIG. 6, the box 230 shields the interior of the box from an external signal corresponding to the first signal. However, the shielding may be less perfect because of one or more through holes to conduct an optical fiber from the exterior of the box to the interior or vice versa.

Light may comprise visible light or a part of the visible spectrum. In some embodiments, light may comprise another part than the visible part of the electromagnetic spectrum such as infrared light or ultraviolet light. The light detector may be any light detector suitable to detect the relevant light such as a photodiode, a CCD, etc.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. Apparatus, comprising
an optical fiber adapted to propagate propagating light; a detecting means adapted to detect at least one of a detection light and a smoke as a first signal caused by at least one of a fiber fuse and a burning of a coating of a portion of the optical fiber, wherein the detection light is not propagated through the optical fiber, and wherein the detecting means is not in physical contact with the portion of the optical fiber.

2. The apparatus according to claim 1, further comprising a box, wherein
the detecting means and the portion of the optical fiber are arranged in an interior of the box;
at least the interior of the box except for the portion of the optical fiber is shielded from a second signal from an exterior of the box; and
the detecting means is adapted to detect the first signal and is also suitable to detect the second signal in a same manner.

3. The apparatus according to claim 1, further comprising first comparing means adapted to compare the first signal with a first predefined threshold; and
alarming means adapted to cause an alarm generating means to generate an alarm if the first signal exceeds the first predefined threshold.

4. The apparatus according to claim 3,
further comprising second comparing means adapted to compare the first signal with a second predefined threshold.

5. The apparatus according to claim 3,
further comprising second comparing means adapted to compare the first signal with a second predefined threshold.

6. The apparatus according to claim 1, further comprising a focusing optics provided at the detecting means and imaging a critical portion of the optical fiber onto the detector.

7. The apparatus according to claim 6, wherein the first signal is subjected to some further signal processing before comparing it with threshold values.

8. The apparatus according to claim 1, wherein the detecting means is not sensitive to radiation in the infrared range.

9. Apparatus, comprising
a box;
an optical fiber whereof at least a portion is arranged in an interior of the box;
a detecting means arranged in the interior of the box and configured to detect a first signal, wherein
the first signal is caused by at least one of a fiber fuse and a burning of a coating of the portion of the optical fiber;
at least the interior of the box except for the portion of the optical fiber is shielded from a second signal from an exterior of the box; and
the detecting means is adapted to detect the first signal and is also suitable to detect the second signal in a same manner.

10. The apparatus according to claim 9, wherein the first signal comprises at least one of a detection light and a smoke.

11. The apparatus according to claim 9, wherein the box is a fiber distribution box comprising in the interior of the box a connecting means to which the portion of the optical fiber is connected.

12. The apparatus according to claim 11, wherein the connecting means comprises at least one of a splice and a connector.

13. The apparatus according to claim 9,
wherein the box is configured to conduct at least one optical fiber from an exterior of the box to an interior of the box or vice versa;
having at least one of a mounting means adapted to mount a connecting means to which the optical fiber may be connected and a guiding means adapted to guide the optical fiber, wherein the at least one of the mounting means and the guiding means is arranged in the interior of the box; and
wherein the first signal is at least one of a light and a smoke.

14. A system, comprising
a plurality of optical fibers; and
a detecting apparatus according to claim 9, wherein
at least one portion of at least one of the plurality of optical fibers is comprised by the detecting apparatus.

15. The apparatus according to claim 9, wherein the optical fiber has, at the portion, a small radius of curvature and/or is close to a disturbance.

16. Apparatus comprising:
an optical fiber adapted to propagate propagating light;
a detecting means adapted to detect at least one of a detection light and a smoke as a first signal caused by at least one of a fiber fuse and a burning of a coating of a portion of the optical fiber, wherein the detection light is not propagated through the optical fiber; and
wherein the optical fiber has, at the portion, a small radius of curvature and/or is close to a disturbance.

17. Apparatus comprising:
an optical fiber adapted to propagate propagating light;
a detecting means adapted to detect at least one of a detection light and a smoke as a first signal caused by at least one of a fiber fuse and a burning of a coating of a portion of the optical fiber, wherein the detection light is not propagated through the optical fiber;
comparing means adapted to compare the first signal with a predefined threshold; and
controlling means adapted to control a light source injecting propagating light into the optical fiber such that a light intensity of the propagating light does not exceed a fuse threshold if the first signal exceeds the predefined threshold.

18. The apparatus according to claim 17 further comprising
first comparing means adapted to compare the first signal with a first predefined threshold.

19. The apparatus according to claim 18, further comprising alarming means adapted to cause an alarm generating means to generate an alarm if the first signal exceeds the first predefined threshold.

20. The apparatus according to claim 17, wherein the optical fiber has, at the portion, a small radius of curvature and/or is close to a disturbance.

* * * * *